United States Patent
Adachi

(10) Patent No.: US 9,384,434 B2
(45) Date of Patent: Jul. 5, 2016

(54) IMAGE FORMING APPARATUS CAPABLE OF MAKING USER AWARE OF SECURITY POLICY VIOLATION, METHOD OF CONTROLLING THE IMAGE FORMING APPARATUS, AND STORAGE MEDIUM

(71) Applicant: CANON KABUSHIKI KAISHA, Tokyo (JP)

(72) Inventor: Tomoko Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/302,608

(22) Filed: Jun. 12, 2014

(65) Prior Publication Data
US 2014/0376027 A1   Dec. 25, 2014

(30) Foreign Application Priority Data
Jun. 19, 2013   (JP) ................... 2013-128531

(51) Int. Cl.
  *G06F 3/12*     (2006.01)
  *G06F 7/04*     (2006.01)
  *G06K 15/00*    (2006.01)
  *G06F 21/60*    (2013.01)
  *G06K 15/02*    (2006.01)

(52) U.S. Cl.
CPC .......... *G06K 15/4095* (2013.01); *G06F 21/608* (2013.01)

(58) Field of Classification Search
CPC ............ H04N 1/0084; H04N 1/00854; H04N 1/00875; H04N 1/4413; H04N 1/4433; G06F 3/1204; G06F 3/1222; G06F 3/1238; G06F 3/1267; G06F 3/1285; G06F 21/608; G06K 15/4095

USPC .......... 358/1.1, 1.9, 2.1, 1.11–1.18, 400–404; 713/182–186; 726/1–3, 26–33; 399/80, 399/366; 705/57; 777/1.1, 1.9, 2.1, 777/1.11–1.18, 400–404

See application file for complete search history.

(56) References Cited

U.S. PATENT DOCUMENTS

| | | | | |
|---|---|---|---|---|
| 5,682,475 A | * | 10/1997 | Johnson | G07C 9/00142 713/183 |
| 8,756,670 B2 | * | 6/2014 | Asano | G06F 21/41 726/5 |
| 9,075,550 B2 | * | 7/2015 | Kakutani | G06F 3/1222 |
| 2005/0091490 A1 | * | 4/2005 | Ogura | G06F 21/34 713/165 |
| 2006/0101279 A1 | * | 5/2006 | Akita | G06F 21/608 713/184 |
| 2006/0259960 A1 | * | 11/2006 | Kondo | G06F 21/46 726/6 |

(Continued)

FOREIGN PATENT DOCUMENTS

JP   2009-230178 A   10/2009

*Primary Examiner* — Chad Dickerson
(74) *Attorney, Agent, or Firm* — Rossi, Kimms & McDowell LLP

(57) ABSTRACT

An image forming apparatus which is capable of making a user aware of a violation of an information security policy. A network communication unit receives data having a user ID attached thereto from an external apparatus. A printing unit prints an image based on the data. A control unit executes user authentication using the user ID attached to the data and determines, when the user authentication is successful, whether or not a password expiration date of the user has passed. When it is determined that the password expiration date has passed, the control unit restricts printing of the image to be printed based on the data having the user ID attached thereto.

5 Claims, 12 Drawing Sheets

(56) References Cited

U.S. PATENT DOCUMENTS

| | | | | |
|---|---|---|---|---|
| 2006/0268323 A1* | 11/2006 | Hashimoto | G06F 3/1222 | 358/1.15 |
| 2006/0291453 A1* | 12/2006 | Kuwahara | H04L 67/02 | 370/352 |
| 2009/0295540 A1* | 12/2009 | Yamamoto | H04N 1/32021 | 340/5.85 |
| 2009/0300733 A1* | 12/2009 | Inomata | H04L 63/08 | 726/5 |
| 2010/0014110 A1* | 1/2010 | Munetomo | H04N 1/0084 | 358/1.14 |
| 2012/0148323 A1* | 6/2012 | Shimada | G06F 3/1204 | 400/76 |
| 2014/0293315 A1* | 10/2014 | Takarabe | H04N 1/32122 | 358/1.14 |

* cited by examiner

FIG. 3A

| POLICY NAME (201) | VALUE RANGE (202) |
|---|---|
| PASSWORD EXPIRATION DATE | 3 MONTHS |

| USER NAME (301) | PASSWORD (302) | PASSWORD EXPIRATION DATE (303) |
|---|---|---|
| YAMADA | ******** | 20121231 |
| SATO | ******** | 20121231 |
| SUZUKI | ******** | 20120930 |
| TAKAHASHI | ******** | 20121130 |
| MIZUNO | ******** | 20121231 |
| ... | ... | ... |

| JOB RECEIPT NUMBER 601 | JOB NAME 602 | USER NAME 603 | JOB STATUS 604 | JOB PROCESSING REASON 605 |
|---|---|---|---|---|
| 001 | REGULAR COMMERCIALIZATION MINUTES | YAMADA | NORMAL OUTPUT | — |
| 002 | PRODUCT PLANNING MATERIAL | SUZUKI | CANCEL | SECURITY POLICY VIOLATION |
| 003 | 9/1 MAIL | YAMADA | AWAITING RESTRICTION CANCELLATION | SECURE PRINTING |
| 004 | DESIGN SPECIFICATION | YAMADA | NORMAL OUTPUT | — |
| ...... | ...... | ...... | ...... | ...... |

FIG. 7A

| JOB PROCESSING NUMBER (801) | JOB NAME (802) | USER NAME (803) | JOB TYPE (804) | JOB STATUS (805) |
|---|---|---|---|---|
| 001 | REGULAR COMMERCIALIZATION MINUTES | Ffff | NORMAL PRINTING | PRINTING |
| 002 | PRODUCT PLANNING MATERIAL | SUZUKI | SECURE PRINTING | AWAITING RESTRICTION CANCELLATION |

*FIG. 7B*

PASSWORD CHANGE SCREEN

USER NAME : SUZUKI
OLD PASSWORD : ********
NEW PASSWORD : ********
CONFIRM PASSWORD : ********

905 — OK  CANCEL

IMAGE FORMING APPARATUS CAPABLE OF MAKING USER AWARE OF SECURITY POLICY VIOLATION, METHOD OF CONTROLLING THE IMAGE FORMING APPARATUS, AND STORAGE MEDIUM

BACKGROUND OF THE INVENTION

1. Field of the Invention

The present invention relates to an image forming apparatus which is capable of making a user aware of a security policy violation, a method of controlling the image forming apparatus, and a storage medium.

2. Description of the Related Art

Personal computers (hereinafter abbreviated as "PCs") and server apparatuses, such as a file server and an authentication server, which are connected to a network in an office or the like should desirably be operated in compliance with an information security policy (hereinafter simply referred to as "the security policy") defined on an office basis.

The security policy is a basic policy concerning the information security of an entire company, and is a collection of policies as to the use of information and prevention of invasion from external apparatuses and leakage of information. The security policy is developed by an administrator in charge of security.

The apparatuses connected to the network in an office include not only the PCs and the server apparatuses but also peripheral apparatuses, such as image forming apparatuses. Recent image forming apparatuses come to not only simply print or transmit images, but also store image data and provide a file service function for the PCs, to thereby play the same roles as played by other server apparatuses connected to the network.

Further, recent image forming apparatuses have their application development environments made open to the public, and similarly to the cases of PCs and the like, applications developed by third parties are available.

Therefore, in order to maintain a safe and secure office environment, the image forming apparatus are requested to be operated in compliance with the security policy, similarly to the PCs and server apparatuses. To be compliant with a security policy is intended to mean that an image forming apparatus in an office complies with restrictions imposed on operation thereof in view of security so as to prevent unauthorized use thereof or leakage of information, e.g. by making user authentication absolutely necessary before it is operated by a user.

A system which manages image forming apparatuses by applying a conventional security policy thereto is provided with a security policy verification unit configured to detect a security policy violation by any of the image forming apparatuses.

Further, there has been disclosed a security policy compliance system configured to temporarily stop access to an image forming apparatus when the security policy verification unit detects a security policy violation thereby, so as to prevent the image forming apparatus from executing an operation against the security policy (see e.g. Japanese Patent Laid-Open Publication No. 2009-230178).

However, even when the security policy compliance system disclosed in Japanese Patent Laid-Open Publication No. 2009-230178 is provided, processes available without authentication can be executed.

Specifically, for example, even in an environment of an image forming apparatus where a security policy is applied, in a case where data for job execution is transmitted to the image forming apparatus from a PC via a network, some processes, such as LPR printing and RAW printing, can be executed without authentication.

In this case, even a job from a user who has violated the security policy applied to the image forming apparatus is executed if the job does not necessitate user authentication.

Further, it is impossible to notify the user that a security policy violation has occurred. That is, there is a security problem that in spite of using the image forming apparatus against the security policy, the user can continue using the image forming apparatus without being aware of the security policy violation.

SUMMARY OF THE INVENTION

The present invention provides an image forming apparatus which is capable of making a user aware of a violation of an information security policy, a method of controlling the image forming apparatus, and a storage medium.

In a first aspect of the present invention, there is provided an image forming apparatus comprising a network communication unit configured to receive data having a user ID attached thereto from an external apparatus, a printing unit configured to print an image based on the data, and a control unit configured to execute user authentication using the user ID attached to the data and determine whether or not a password expiration date of the user has passed, wherein when it is determined that the password expiration date has passed, the control unit restricts printing of the image to be printed based on the data having the user ID attached thereto.

In a second aspect of the present invention, there is provided a method of controlling an image forming apparatus including a printing unit configured to print an image based on data, comprising receiving data having a user ID attached thereto from an external apparatus, executing user authentication using the user ID attached to the data and determine, when the user authentication is successful, whether or not a password expiration date of the user has passed, and restricting, when it is determined that the password expiration date has passed, printing of the image to be printed based on the data having the user ID attached thereto.

In a third aspect of the present invention, there is provided a non-transitory computer-readable storage medium storing a computer-executable program for causing a computer to execute a method of controlling an image forming apparatus including a printing unit configured to print an image based on data, wherein the method comprises receiving data having a user ID attached thereto from an external apparatus, executing user authentication using the user ID attached to the data and determine, when the user authentication is successful, whether or not a password expiration date of the user has passed, and restricting, when it is determined that the password expiration date has passed, printing of the image to be printed based on the data having the user ID attached thereto.

According to the present invention, it is verified, using security data, whether or not job data is compliant with an information security policy, and when it is determined that the job data is not compliant with the information security policy, execution of a print job using the job data is restricted, so that it is possible to make the user aware of a violation of the information security policy.

Further features of the present invention will become apparent from the following description of exemplary embodiments (with reference to the attached drawings).

BRIEF DESCRIPTION OF THE DRAWINGS

FIG. 3A is a view of security policy data.

FIG. 3B is a view of user information.

FIG. 4B is a view of a job history.

FIG. 7A is a view of a job list displayed on a user interface console or a display section appearing in FIG. 1.

FIG. 7B is a view of a password change screen.

DESCRIPTION OF THE EMBODIMENTS

The present invention will now be described in detail below with reference to the accompanying drawings showing an embodiment thereof.

Figure 1:
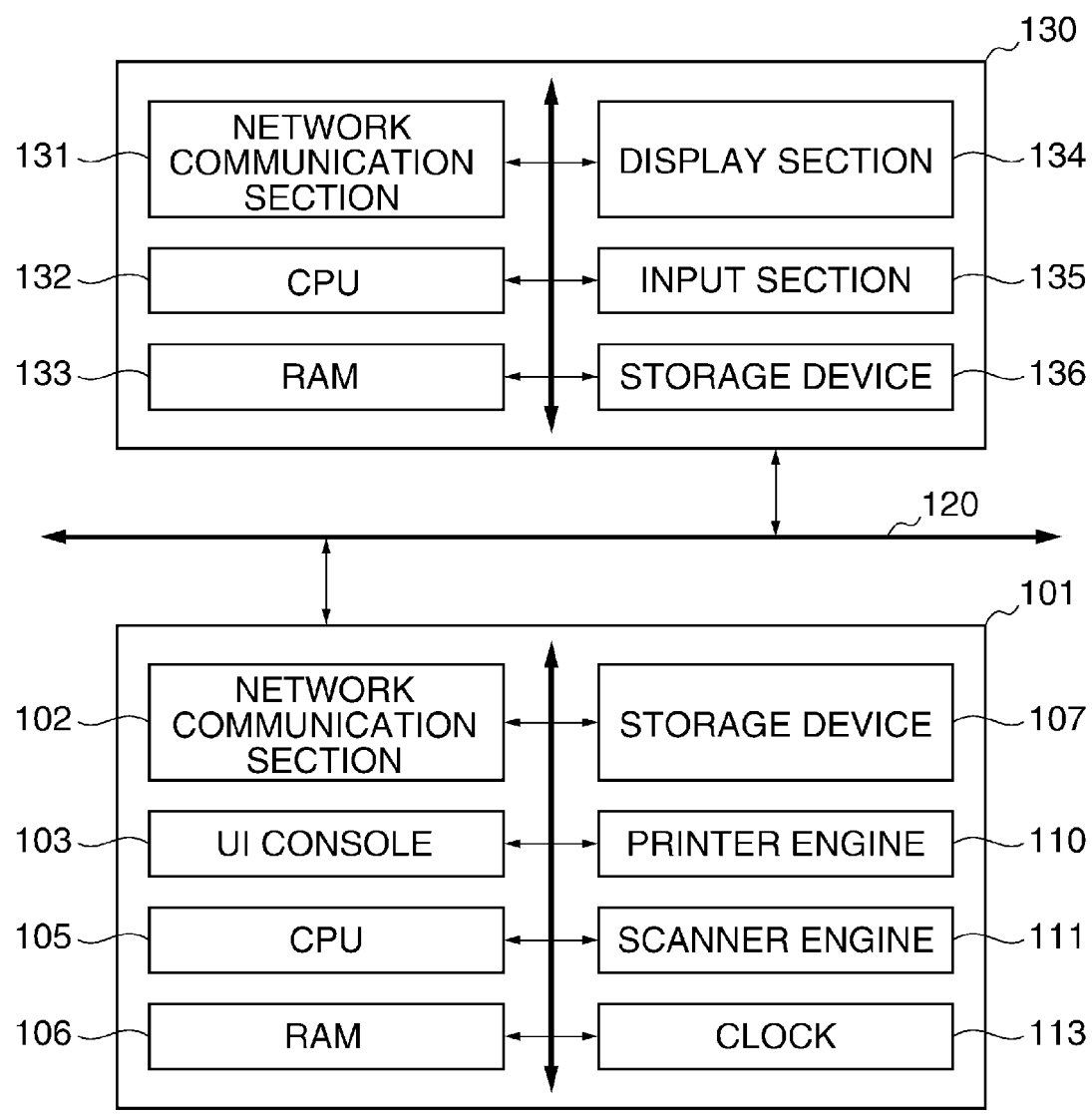
FIG. 1 is a schematic block diagram of an information processing system including an image forming apparatus according to an embodiment of the present invention, and a PC.

FIG. 1 is a schematic block diagram of an information processing system 100 including an image forming apparatus 101 according to the embodiment of the present invention, and a PC (personal computer) 130.

Referring to FIG. 1, the image forming apparatus 101 and the PC 130 as an external apparatus are interconnected by a network 120 such that they can communicate with each other. Note that FIG. 1 only illustrates an example of the information processing system, and therefore apparatuses connected to the network and the number of the apparatuses are not limited to those of the example shown in FIG. 1.

The image forming apparatus 101 comprises a network communication section 102, a user interface (UI) console 103, a CPU 105, a RAM 106, a storage device 107, a printer engine 110, a scanner engine 111, and a clock 113.

The network communication section 102 communicates with the PC 130 and other external apparatuses via the network 120. The user interface console 103 which serves as a display section and an operating section of the image forming apparatus 101 receives settings configured by user operation for the image forming apparatus 101 or displays the status of the image forming apparatus 101.

The CPU 105 controls the overall operation of the image forming apparatus 101. The RAM 106 temporarily stores information, such as program code executed by the CPU 105 and image data. The storage device 107 stores program code, image data, and user information.

The printer engine 110 prints image data on a sheet medium using a known technology, such as electrophotography or inkjet. The scanner engine 111 optically reads an image printed on a sheet medium.

The clock 113 is the internal clock of the image forming apparatus 101. In the present embodiment, the clock 113 is used in performing verification of compliance with an information security policy (hereinafter simply referred to as "the security policy").

The PC 130 comprises a network communication section 131, a CPU 132, a RAM 133, a display section 134, an input section 135, and a storage device 136.

The network communication section 131 communicates with an external apparatus, such as the image forming apparatus 101, via the network 120. The CPU 132 controls the overall operation of the PC 130. The RAM 133 temporarily stores information, such as program code executed by the CPU 132.

The display section 134 displays application screens and other various kinds of information. The input section 135 receives a user input to the PC 130. The storage device 136 stores program code and data.

Figure 2A:
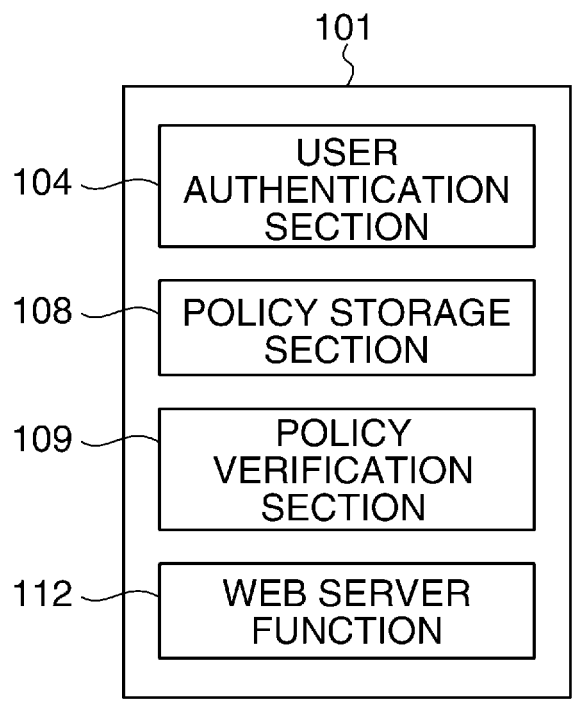
FIG. 2A is a schematic diagram of the software configuration of the image forming apparatus appearing in FIG. 1.

FIG. 2A is a schematic diagram of the software configuration of the image forming apparatus 101 appearing in FIG. 1, and FIG. 2A is a schematic diagram of the software configuration of the PC 130 appearing in FIG. 1.

Referring to FIG. 2A, the image forming apparatus 101 comprises a user authentication section 104, a policy storage section 108, a policy verification section 109, and a Web server function 112.

The user authentication section 104 performs authentication by comparing user information including a user ID and a password input via the user interface console 103 with user information stored in the storage device 107 managed by the image forming apparatus 101.

The policy storage section 108 stores security policy data, which has been set in the image forming apparatus 101, in the storage device 107. The security policy data will be described hereinafter.

The policy verification section 109 verifies whether or not the image forming apparatus 101 is being used in compliance with the security policy data. In the following description, the verification as to whether or not the image forming apparatus 101 is being used in compliance with the security policy data will be simply referred to as the policy verification.

The Web server function 112 is a function for enabling the image forming apparatus 101 to be operated remotely via the network 120.

Figure 2B:
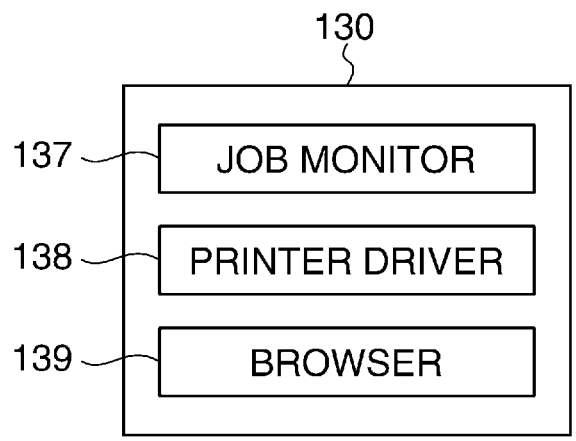
FIG. 2B is a schematic diagram of the software configuration of the PC appearing in FIG. 1.

Referring to FIG. 2B, the PC 130 comprises a job monitor 137, a printer driver 138, and a browser 139.

The job monitor 137 monitors the status of a job being executed by the image forming apparatus 101 via the network 120. Specifically, the job monitor 137 monitors the job status including a job error and a job deletion, and notifies the PC 130 of a change in the job status.

The printer driver 138 is software for controlling the image forming apparatus 101 when the user prints data. The browser 139 is used for remote control of the image forming apparatus 101.

With the above-described configuration, when requesting the image forming apparatus 101 to execute printing, the PC 130 causes the printer driver 138 to send print data as job data for executing a print job, from the network communication section 131 to the image forming apparatus 101 via the network 120.

The image forming apparatus 101 receives the job data via the network communication section 102 and causes the user authentication section 104 to execute user authentication. Then, when it is verified by the policy verification section 109 that the job data is compliant with the security policy, the printer engine 110 executes printing after additionally performing necessary image processing on the job data.

FIG. 3A is a view of security policy data, and FIG. 3B is a view of user information.

Referring to FIG. 3A, security policy data 200 is indicative of a predetermined information security policy. The security policy data 200 comprises a policy name 201 and a value range 202. In an example illustrated in FIG. 3A, the policy name 201 is "password expiration date", and the value range 202 is "three months".

Although FIG. 3A shows the security policy data in a tabular format, it may be in another data format, such as XML.

The policy verification section 109 verifies whether or not the image forming apparatus 101 is being used in a state compliant with the value range 202 of the security policy data 200.

Referring to FIG. 3B, the user information, denoted by reference numeral 300, comprises a user name 301, a password 302, and a password expiration date 303. Besides these, the user information 300 may include other management data, such as limits to the number of password characters. Among the above-mentioned items, the password expiration date corresponds to related data concerning security data, described hereinafter.

By using the clock 113, the image forming apparatus 101 determines the password expiration date 303 based on a date when the user made user authentication settings and "three months" set as the value range 202 of the password expiration date of the security policy data 200.

Figure 4A:
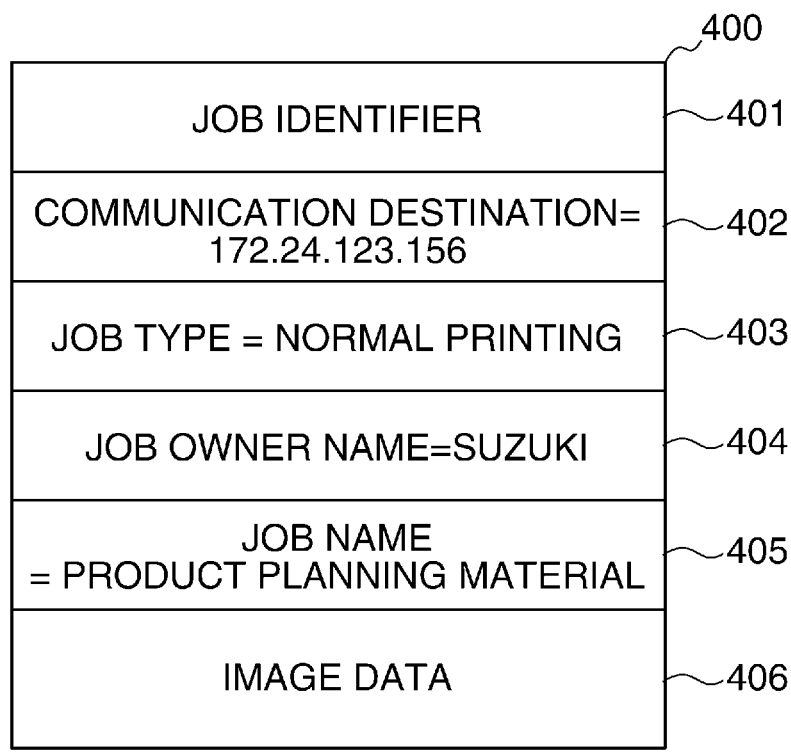
FIG. 4A is a view of job data.

FIG. 4A is a view of job data, and FIG. 4B is a view of a job history.

Referring to FIG. 4A, Job data 400 is job data transmitted from the PC 130 by a user represented by a user name "Suzuki" appearing in FIG. 3B.

The job data 400 comprises a job identifier 401, a communication destination 402, a job type 403, a job owner name 404, a job name 405, and image data 406.

The job identifier 401 is for identifying the job data. The communication destination 402 indicates an IP address of the PC 130. The job type 403 is set to either normal printing or secure printing in the present embodiment.

Normal printing is a job type in which printing is executed immediately in response to a print instruction issued to the image forming apparatus 101 by a user. On the other hand, secure printing is a job type in which when a user issues a print instruction to the image forming apparatus 101, job data is temporarily stored in the storage device 107 of the image forming apparatus 101, and after the user performs authentication action e.g. by entering a password, printing is executed by canceling the state of temporary storage of the job data.

The job owner name 404 indicates the name of a user who has sent the job data. The job owner name 404 corresponds to security data for use in verifying whether the job data is compliant with the security policy which has been set in advance in the present embodiment. The job data thus contains the security data. The policy verification section 109 identifies related data (password expiration date) concerning the security data, using the security data (the user name, the job owner name), to thereby verify whether the job data is compliant with the security policy, in other words, verify whether or not the image forming apparatus 101 is being used in a state compliant with the security policy, in short, execute the aforementioned policy verification.

General authentication requires a user name and a password. However, the process for executing a print job in the present embodiment is different from a process executed after execution of the general authentication in that only a user name is required as described above.

The job name 405 indicates the name of a job. The image data 406 indicates an image to be printed. The job data 400 may include other information items than the above-described ones.

Referring to FIG. 4B, the job history illustrated here is displayed on the user interface console 103. The job history includes a job receipt number 601, the job name, denoted by reference numeral 602, the user name, denoted by reference numeral, 603, a job status 604, and a job processing reason 605. The job receipt number 601 is a number indicating a receipt order of a job.

In the job history illustrated in FIG. 4B, the job status 604 shows that the job associated with the user name "Suzuki" has been canceled. Further, the job processing reason 605 shows that the job was canceled due to a security policy violation. Further, in the job status 604, a state in which job data is temporarily stored for secure printing is expressed as awaiting restriction cancellation.

Figure 5:
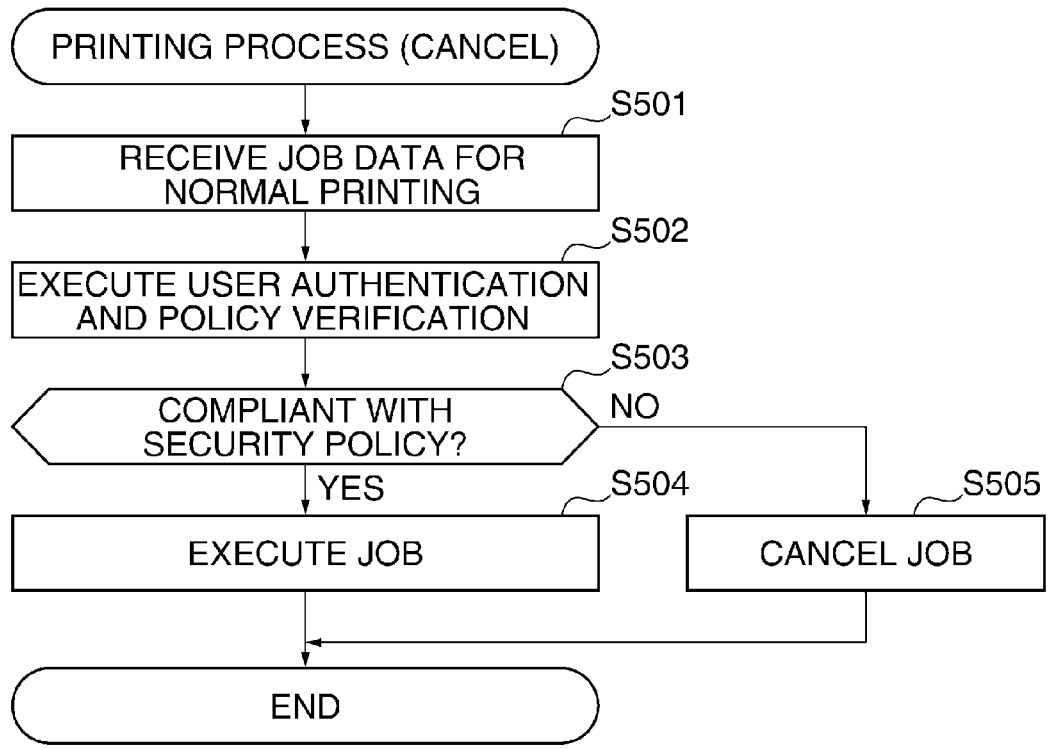
FIG. 5 is a flowchart of a printing process (cancel) executed by a CPU appearing in FIG. 1.

FIG. 5 is a flowchart of a printing process (cancel) executed by the CPU 105 appearing in FIG. 1.

Referring to FIG. 5, when job data for normal printing is received by the network communication section 102 (step S501), the user authentication section 104 executes user authentication, and the policy verification section 109 executes the policy verification (step S502).

Next, it is determined based on the result of the policy verification whether or not the job data is compliant with the security policy (step S503). If it is determined in the step S503 that the job data is compliant with the security policy (YES to the step S503), the job is executed (step S504), followed by terminating the present process.

On the other hand, if it is determined in the step S503 that the job data is not compliant with the security policy (NO to the step S503), the job is canceled (step S505), followed by terminating the present process. The step S505 corresponds to an operation of a control unit configured to configured to execute user authentication using user ID attached to data and determine whether or not a password expiration date of the user has passed.

The present process will be described in more detail based on an example. First, it is assumed that the data illustrated in FIG. 4A was received as job data and a date when the job data was received is Oct. 15, 2012. In this case, the job owner name 404 is Suzuki, and the password expiration date associated with Suzuki is Sep. 30, 2012.

The policy verification section 109 compares the reception date of Oct. 15, 2012 and the password expiration date of Sep. 30, 2012 to thereby execute policy authentication. In the present case, since the password expiration date has passed, it is determined that the image forming apparatus 101 is not being used in compliance with the security policy, in other words that the job data is not compliant with the security policy. Therefore, printing of the job data is canceled.

At this time, the job history shown in FIG. 4B is displayed, whereby it is possible for the user to know the reason why printing of the job data was not executed. Note that although in the present embodiment, the job history shown in FIG. 4B is displayed on the user interface console 103 of the image forming apparatus 101, the job history may be displayed on the display section 134 of the PC 130 using the browser 139.

According to the process in FIG. 5, even in normal printing where authentication has been conventionally dispensed with, a job that is not compliant with a security policy is canceled. This makes it possible to make the user aware of a security policy violation and prompt the user to comply with the security policy.

Figure 6:
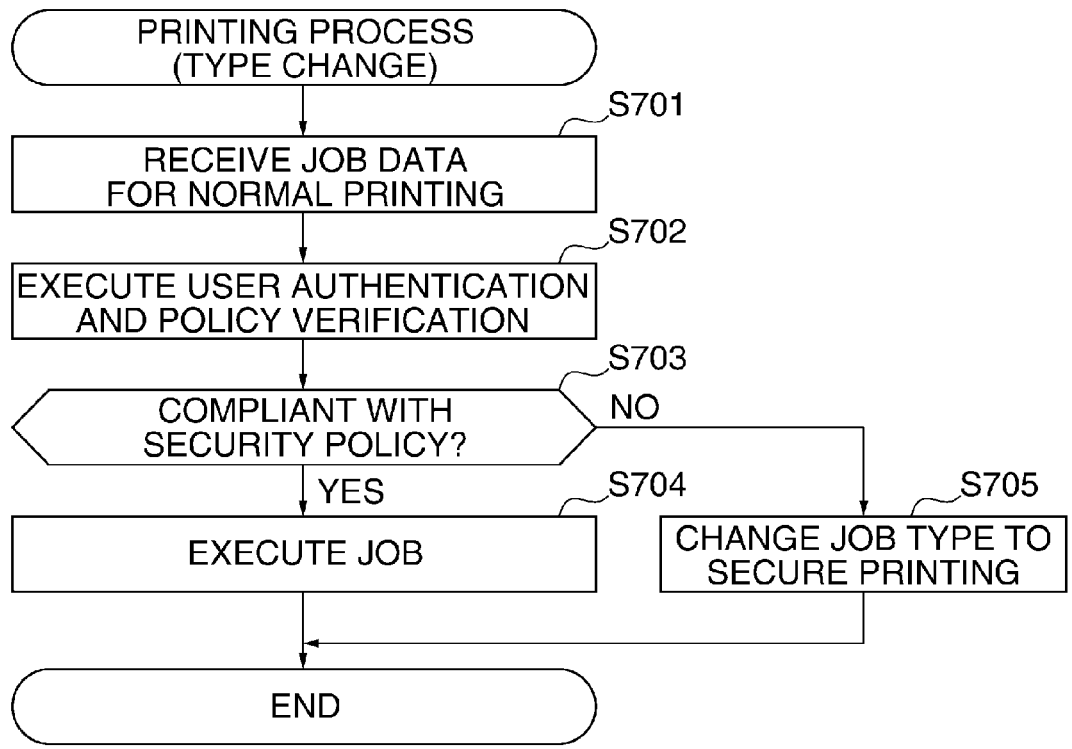
FIG. 6 is a flowchart of a printing process (type change) executed by the CPU appearing in FIG. 1.

FIG. 6 is a flowchart of a printing process (type change) executed by the CPU 105 appearing in FIG. 1.

Referring to FIG. 6, when job data for normal printing is received by the network communication section 102 (step S701), the user authentication section 104 executes user authentication, and the policy verification section 109 executes the policy verification (step S702).

Next, it is determined based on the result of the policy verification whether or not the job data is compliant with the security policy (step S703). If it is determined in the step S703 that the job data is compliant with the security policy (YES to the step S703), the job is executed (step S704), followed by terminating the present process.

On the other hand, if it is determined in the step S703 that the job data is not compliant with the security policy (NO to the step S703), the job type is changed from normal printing to secure printing described above (step S705), followed by terminating the present process.

When the job type is changed to secure printing, the job data is temporarily stored in the storage device 107 of the image forming apparatus 101 and is printed after the user performs authentication action e.g. by entering the password.

FIG. 7A is a view of a job list displayed on the user interface console 103 or the display section 134 appearing in FIG. 1, and FIG. 7B is a view of a password change screen.

Referring to FIG. 7A, the job list comprises a job processing number 801, a job name 802, a user name 803, a job type 804, and a job status 805.

The job name 802, the user name 803, the job type 804, and the job status 805 are the same as described hereinbefore with reference to FIG. 4A. The job processing number 801 is a number indicating an order of processing of a job.

A user can check the job type 804 or the job status 805 and verify that the job type of a job has been changed to secure printing through the FIG. 6 process.

In order that the user is permitted to execute printing, the job type set to secure printing has to be changed to normal printing, and this necessitates user authentication.

In this case, the user is prompted to change the password which is not compliant with the security policy on the general password change screen shown in FIG. 7B. The configuration may be such that when the user presses an OK button 905 on the general password change screen, not only password change but also printing is executed.

According to the printing process in FIG. 6, the job type of a job which is not compliant with a security policy is changed to secure printing, so that it is possible to make the user aware of a security policy violation and prompt the user to comply with the policy.

Further, since user authentication is necessitated so as to cancel the setting of secure printing, it is possible to prompt the user to change the password which is not compliant with the security policy.

Figure 8:
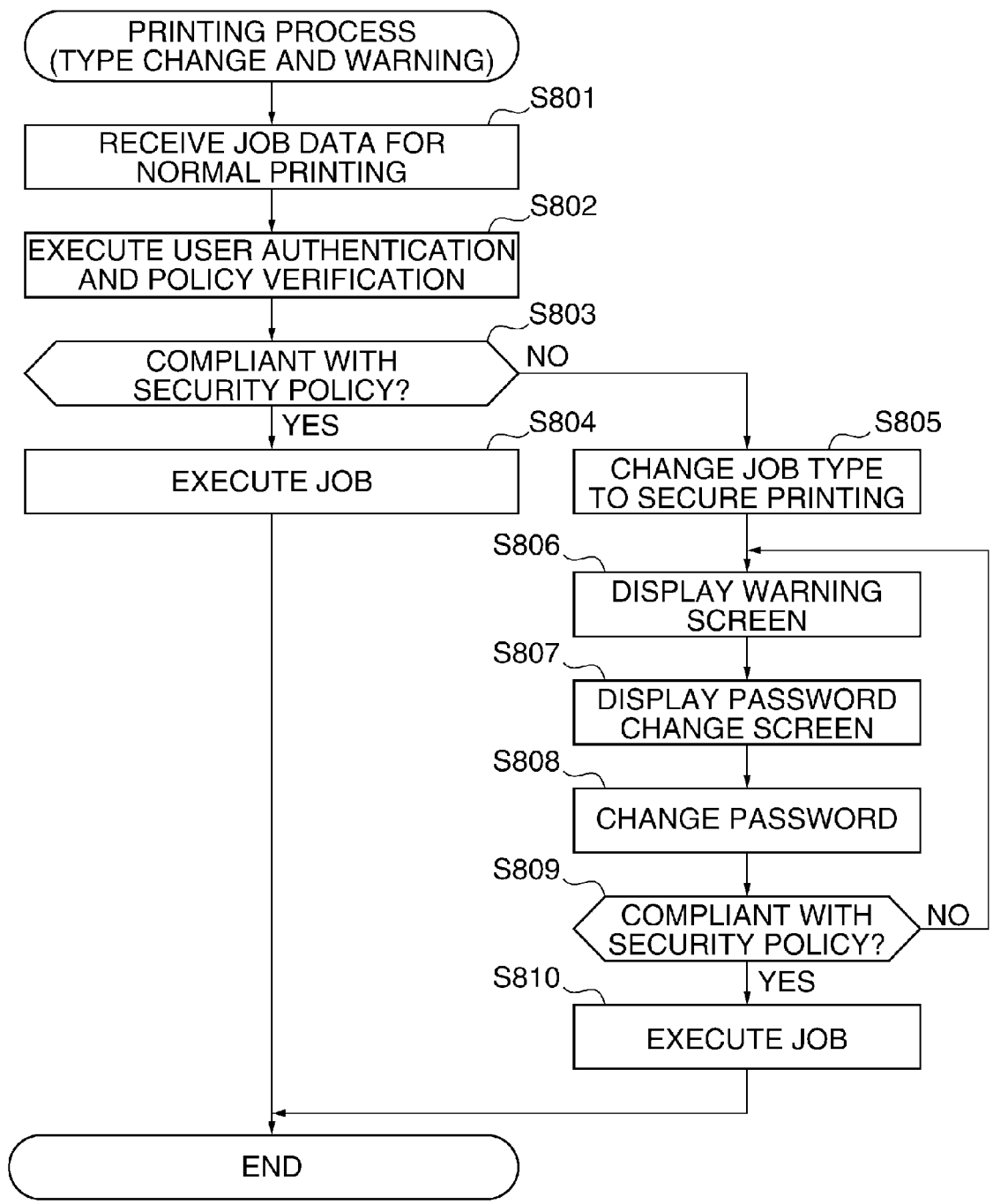
FIG. 8 is a flowchart of a printing process (type change and warning) executed by the CPU appearing in FIG. 1.

FIG. 8 is a flowchart of a printing process (type change and warning) executed by the CPU 105 appearing in FIG. 1.

Referring to FIG. 8, when job data for normal printing is received by the network communication section 102 (step S801), the user authentication section 104 executes user authentication, and the policy verification section 109 executes the policy verification (step S802). Here, it is to be understood that when the user authentication is successful, the policy verification is executed.

Next, it is determined based on the result of the policy verification whether or not the job data is compliant with the security policy (step S803). If it is determined in the step S803 that the job data is compliant with the security policy (YES to the step S803), the job is executed (step S804), followed by terminating the present process.

On the other hand, if it is determined in the step S803 that the job data is not compliant with the security policy (NO to the step S803), the job type is changed from normal printing to secure printing described above (step S805).

Then, a warning screen indicating that printing is not executed since the security policy is not complied with, i.e. the security policy is violated, and that password change is necessitated for execution of printing is displayed on the user interface console 103 (step S806). The warning screen will be described hereinafter. In the present process, by changing the password, the setting of secure printing is canceled, so that printing is executed.

Then, the password change screen shown in FIG. 7B is displayed (step S807). If the password is changed on the password change screen (step S808), the user authentication section 104 stores a new password, and the policy verification is executed to determine whether or not the job data is compliant with the security policy (step S809).

If it is determined in the step S809 that the job data comes to be compliant with the security policy (YES to the step S809), the job is executed (step S810), followed by terminating the present process. Thus, in a case where the related data (password expiration date) is changed such that it complies with the security policy, through the change of the password, the print job which has been restricted is executed.

On the other hand, if it is determined in the step S809 that the job data is not compliant with the security policy (NO to the step S809), the process returns to the step S806.

Figure 9A:
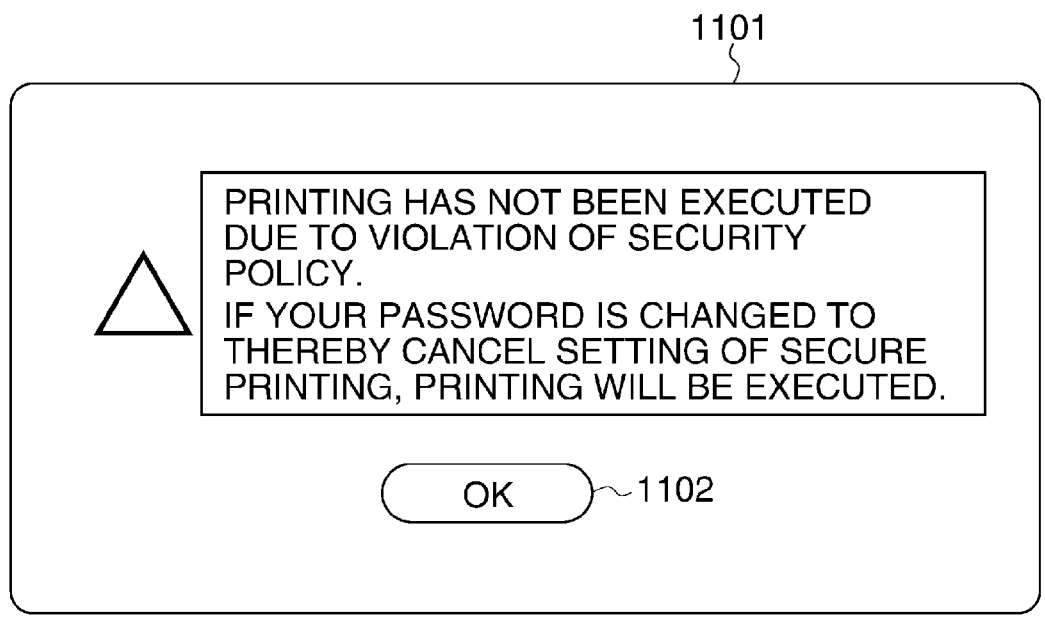
FIG. 9A is a view of a warning screen displayed on the user interface console.
Figure 9B:
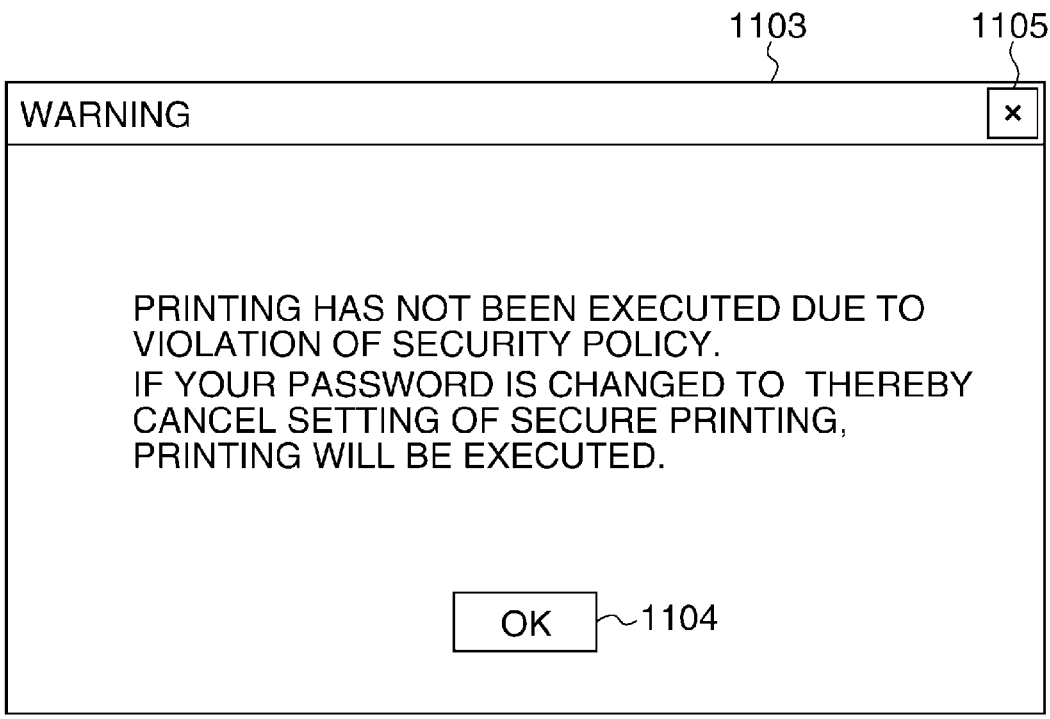
FIG. 9B is a view of a warning screen displayed on a browser of the PC appearing in FIG. 1.

FIG. 9A is a view of a warning screen 1101 displayed on the user interface console 103, and FIG. 9B is a view of a warning screen 1103 displayed using the browser 139 of the PC 130.

Although in FIG. 8, the warning screen is displayed on the user interface console 103, the warning screen may be displayed using the browser 139 of the PC 130 as shown in FIG. 9B.

On either of the two warning screens, when an OK button 1102 or 1104 is pressed, the process in FIG. 8 proceeds from the step S806 to the step S807. On the warning screen 1103 displayed on the PC 130, the user can press a CLOSE button 1105 as well to thereby refuse to change the password. As described above, a user who has caused the PC 130 to transmit job data is allowed to change the related data, i.e. the password expiration date by password change, using the image forming apparatus 101 or the PC 130.

In the following, a description will be given of processing executed in the case of displaying the warning screen using the browser 139 of the PC 130.

Figure 10:
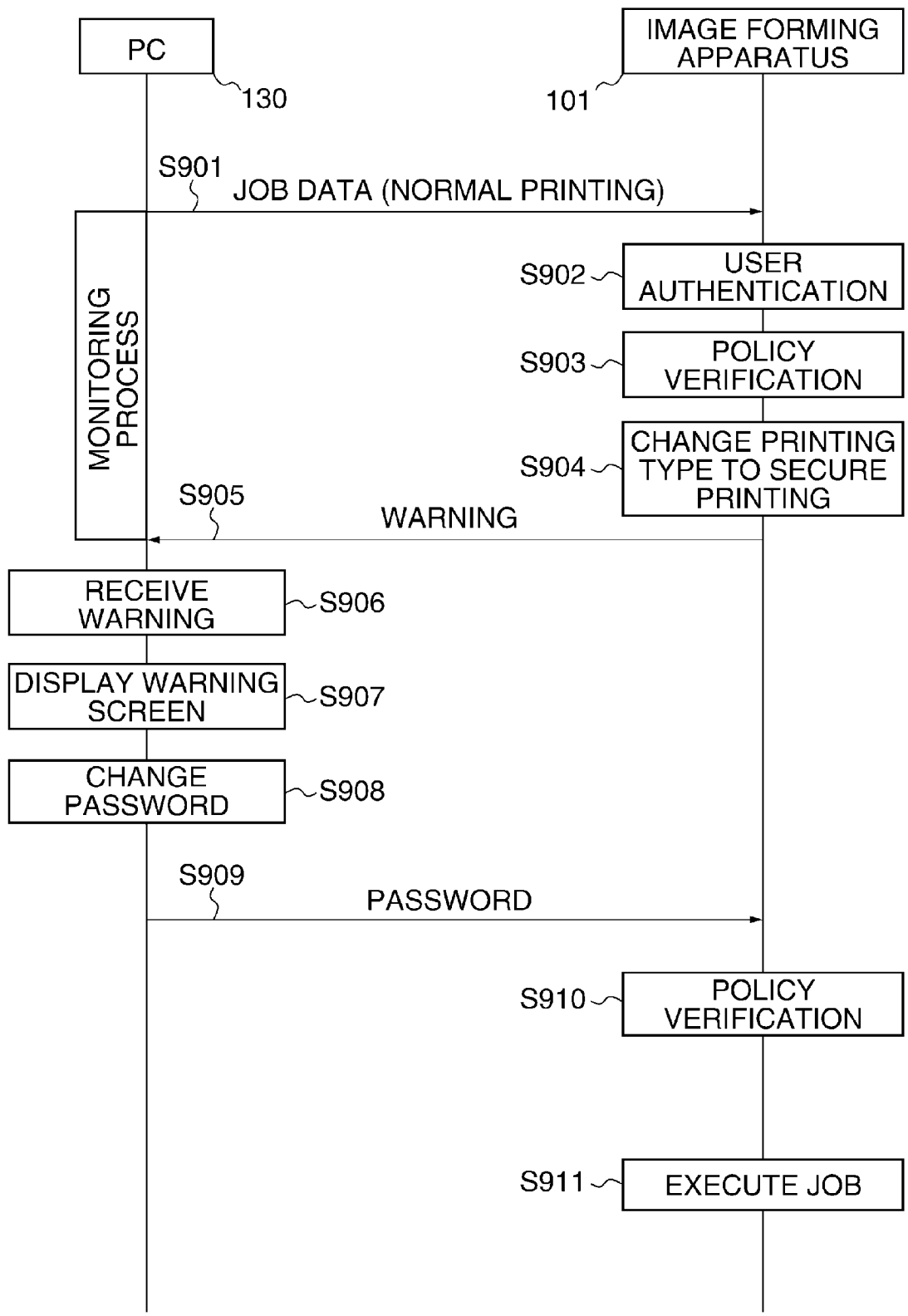
FIG. 10 is a sequence diagram useful in explaining the outline of processing executed between the PC and the image forming apparatus shown in FIG. 1.

FIG. 10 is a sequence diagram useful in explaining the outline of the processing executed between the PC 130 and the image forming apparatus 101 shown in FIG. 1.

Referring to FIG. 10, the PC 130 sends job data for normal printing to the image forming apparatus 101 (step S901). Then, the PC 130 performs a monitoring process for monitoring whether or not a warning from the image forming apparatus 101 has been received. This warning is one indicating that printing has not been executed due to a security policy violation and that printing will be executed if the password is changed to cancel the setting of secure printing.

Then, the image forming apparatus 101 executes user authentication by the user authentication section 104 (step S902) and policy verification by the policy verification section 109 (step S903).

In the case of the illustrated sequence diagram, it is assumed that that the job data is determined not to be compliant with the security policy, and hence the image forming apparatus 101 changes the job type to secure printing (step S904), and notifies the warning (step S905). The warning sent in the step S905 corresponds to information for causing the display section 134 of the PC 130 to display the warning screen when execution of a print job is restricted.

Upon receipt of the warning through the monitoring process (step S906), the PC 130 displays the warning screen shown in FIG. 9B using the browser 139 of the PC 130 (step S907). Further, after displaying the password change screen shown in FIG. 7B, and if the password is changed to a new one (step S908), the PC 130 transmits the new password (step S909).

The image forming apparatus 101 stores the received new password and then executes the policy verification (step S910). If the job data is compliant with the security policy, the job is executed (step S911), followed by terminating the present processing.

Figure 11A:
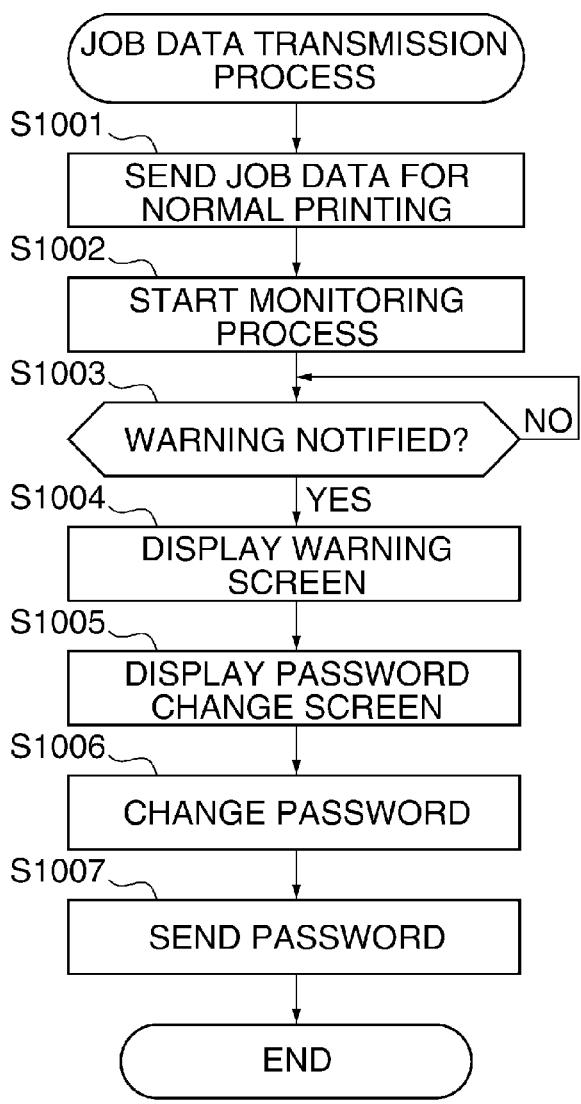
FIG. 11A is a flowchart of a job data transmission process in the FIG. 10 sequence diagram, which is executed by the PC.
Figure 11B:
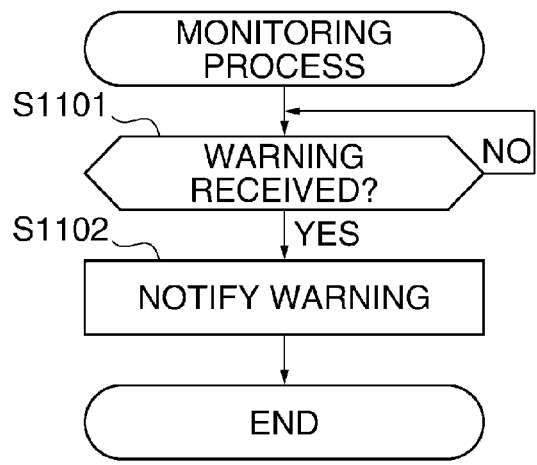
FIG. 11B is a flowchart of a monitoring process in the FIG. 10 sequence diagram, which is executed by the PC.

FIG. 11A is a flowchart of the job data transmission process in the FIG. 10 sequence diagram, which is executed by the PC 130, and FIG. 11B is a flowchart of the monitoring process in the FIG. 10 sequence diagram, which is executed by the PC 130.

Referring to FIG. 11A, the PC 130 transmits job data for normal printing to the image forming apparatus 101 (step S1001) and starts the monitoring process which has been mentioned hereinabove and will also be described with reference to FIG. 11B (step S1002). Then, if the warning is notified via the monitoring process (YES to a step S1003), the warning screen shown in FIG. 9B is displayed using the browser 139 of the PC 130 (step S1004) and then the password change screen shown in FIG. 7B is displayed (step S1005). If the password is changed to a new one (step S1006), the PC 130 transmits the new password (step S1007), followed by terminating the present process.

Although the password is changed in the step S1006, the user can select not to change the password as described hereinabove. In this case, the present process is immediately terminated.

Referring to FIG. 11B, if the warning is received from the image forming apparatus 101 (YES to a step S1101), the PC 130 notifies the warning to the job data transmission process (step S1102), followed by terminating the present process.

According to the processes and sequence shown in FIGS. 8, 10, 11A, and 11B described above, when the job type of job data transmitted by a user is changed to secure printing due to a security policy violation, the warning screen shown in FIG. 9A or 9B is displayed, which enables the user to become aware of a security policy violation and immediately correct the same.

This makes it possible to save user's time and labor while maintaining the security of the image forming apparatus. Note that although in the above-described embodiment, the warning screen is displayed using the browser 139 of the PC 130, the method of notifying a user of a security policy violation is not limited to this, but the notification may be performed e.g. by e-mail.

As descried hereinbefore, conventionally, user authentication is not necessitated in a case where printing is executed by an image forming apparatus in response to a print instruction from a PC, so that a user remains unaware of a security policy violation in a case where the violation actually occurs. Therefore, there is a fear that the image forming apparatus is used in the state of the security policy being violated.

According to the present embodiment, however, even in a case where printing is executed by an image forming apparatus in response to a print instruction from a PC, if a security policy is violated, it is possible to notify the user of the security policy violation and make the user aware of it. Further, the password change screen is displayed which prompts the user to change a password such that the password and hence the job data associated therewith becomes compliant with the security policy, whereby it is possible to reduce user effort required to correct the security policy violation and to omit user operation for giving a print instruction again.

Furthermore, by notifying the user of a security policy violation, it is possible to make the user aware of the security policy violation against an image forming apparatus that the user is using, and prompt the user to correct the security policy violation.

Thus, even in a process which does not require authentication performed by entering a user name and a password, it is possible to make a user conscious of a security policy and build an environment in which the security policy is complied with.

According to the present embodiment, whether or not job data is compliant with an information security policy is verified using security data (step S502), and when it is determined that the job data is not compliant with the information security policy (NO to the step S503), execution of a print job using the job data is restricted (step S505). As a consequence, the user notices that the print job has not been executed. As a result, it is possible to make the user aware of a violation of the information security policy.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-128531 filed Jun. 19, 2013 which is hereby incorporated by reference herein in its entirety.

What is claimed is:

1. An image forming apparatus comprising:
   a processor connected to a memory, the processor and memory being configured to:
   store user information including user names and passwords;
   receive data from an external apparatus, the data having a user name and not having a password;
   execute, if the user name of the received data corresponds to one of the user names which are included in the stored user information and if a password of the corresponding stored user name has not expired, a print process on the basis of the received data; and
   if the user name of the received data corresponds to one of the user names which are included in the stored user information and, if a password of the corresponding user name expired, restrict the print process on the basis of the received data, cause a password change screen to be displayed at at least one of the image forming apparatus and the external apparatus, the password change screen being configured to allow a user to change a password.

2. The image forming apparatus according to claim 1, wherein when the password is changed, said print control unit permits the print process.

3. The image forming apparatus according to claim 1, wherein
   the user names and the passwords included in the user information is used for verifying a user name and a password input via said user interface console.

4. A method of controlling an image forming apparatus including a printing unit configured to print an image based on data, comprising:
   storing, in a storage unit, user information including user names and passwords;
   receiving data from an external apparatus, the data having a user name and not having a password;
   if the user name of the received data corresponds to one of the user names which are included in the user information stored in said storage unit and if a password of the corresponding user name stored in said storage unit has not expired, executing a print process on the basis of the received data; and
   if the user name of the received data corresponds to one of the user names which are included in the user information stored in said storage unit and, if a password of the corresponding user name has expired, restricting the print process on the basis of the received data, causing a password change screen to be displayed at at least one of the image forming apparatus and the external apparatus, the password change screen being configured to allow a user to change a password.

5. A non-transitory computer-readable storage medium storing a computer-executable program for causing a computer to execute a method of controlling an image forming apparatus including a printing unit configured to print an image based on data,
   storing, in a storage unit, user information including user names and passwords;
   receiving data from an external apparatus, the data having a user name and not having a password;
   if the user name of the received data corresponds to one of the user names which are included in the user information stored in said storage unit and if a password of the corresponding user name stored in said storage unit has not expired, executing a print process on the basis of the received data; and
   if the user name of the received data corresponds to one of the user names which are included in the user information stored in said storage unit, and if a password of the corresponding user name has expired, restricting the print process on the basis of the received data, causing a password change screen to be displayed at at least one of the image forming apparatus and the external apparatus, the password change screen being configured to allow a user to change a password.

* * * * *